United States Patent
Poursabahian et al.

(10) Patent No.: US 7,269,388 B2
(45) Date of Patent: Sep. 11, 2007

(54) BLUETOOTH PAN DRIVER

(75) Inventors: Siamak Poursabahian, Redmond, WA (US); Vivek Bhanu, Bellevue, WA (US); Edwin A. Hernandez-Mondragon, Tegucigalpa (HN); Arun Ayyagari, Seattle, WA (US); John W. Archer, Lynnwood, WA (US); Lambert H. Green, Redmond, WA (US); Gaurav Lochan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 10/725,099

(22) Filed: Dec. 1, 2003

(65) Prior Publication Data

US 2005/0118951 A1 Jun. 2, 2005

(51) Int. Cl.
*H04B 7/00* (2006.01)

(52) U.S. Cl. ............... 455/41.2; 455/418; 455/419; 455/411; 455/466; 370/278; 370/252

(58) Field of Classification Search ............ 455/41.2, 455/418, 419, 411, 557, 466; 370/278, 252
See application file for complete search history.

(56) References Cited

U.S. PATENT DOCUMENTS

| | | | |
|---|---|---|---|
| 6,879,570 B1 * | 4/2005 | Choi | 370/329 |
| 6,954,438 B2 * | 10/2005 | Morley et al. | 370/278 |
| 7,106,757 B2 * | 9/2006 | Hong et al. | 370/469 |
| 2003/0027525 A1 * | 2/2003 | Moore et al. | 455/41 |
| 2003/0069989 A1 * | 4/2003 | Silvester | 709/238 |
| 2003/0112822 A1 * | 6/2003 | Hong et al. | 370/469 |
| 2004/0034723 A1 * | 2/2004 | Giroti | 710/8 |
| 2004/0264433 A1 * | 12/2004 | Melpignano | 370/349 |
| 2005/0118951 A1 * | 6/2005 | Poursabahian et al. | 455/41.2 |
| 2005/0261007 A1 * | 11/2005 | Van Valkenburg | 455/466 |

OTHER PUBLICATIONS

U.S. Appl. No. 10/693,655, filed Oct. 24, 2003, Krantz et al.
U.S. Appl. No. 10/724,843, filed Dec. 1, 2003, Bhanu et al.
Bluetooth Special Interest Group, Inc., *Bluetooth Network Encapsulation Protocol (BNEP)*, Version 1.0 (Feb. 14, 2003), printed at https://www.bluetooth.org on Dec. 1, 2003.
Bluetooth Special Interest Group, Inc., *Bluetooth Personal Area Networking Profile*, Version 1.0 (Feb. 14, 2003), printed at https://www.bluetooth.org on Dec. 1, 2003.
Bluetooth Special Interest Group, Inc., *Specification of the Bluetooth System*, Version 1.0 (Dec. 1, 1999), printed at https://www.bluetooth.org on Dec. 1, 2003.
Bluetooth Special Interest Group, Inc., *Specification of the Bluetooth System*, Version 1.2 (Nov. 5, 2003), printed at https://www.bluetooth.org on Dec. 1, 2003.
Bluetooth Special Interest Group. *Bluetooth Protocol Architecture*, Version 1.0 (Sep. 29, 1999). Available at <https://www.bluetooth.org/foundry/sitecontent/document/Protocol_Architecture>.

* cited by examiner

*Primary Examiner*—Matthew Anderson
*Assistant Examiner*—Minh Dao
(74) *Attorney, Agent, or Firm*—Wolf, Greenfield & Sacks, P.C.

(57) ABSTRACT

A system and method for enabling and implementing personal area networking on a local machine having one or more local Bluetooth devices. A set of interoperating data structures are employed in an implementation of a PAN driver, including device control blocks and connection control blocks, which comprise finite state machines. Also disclosed are a method and system for setting and advertising multiple PAN profile roles in a Bluetooth device.

10 Claims, 8 Drawing Sheets

BLUETOOTH PAN DRIVER

TECHNICAL FIELD

The present invention relates generally to devices equipped with Bluetooth wireless network interfaces, and more particularly to systems and methods for enabling and implementing Bluetooth personal area networks.

BACKGROUND

Bluetooth is a short-range wireless technology that uses the 2.4 GHz Industrial, Scientific and Medical (ISM) band. Bluetooth is particularly intended for small mobile devices such as notebook computers, mobile phones, and personal digital assistants (PDAs). Pseudo-random frequency-hopping techniques are employed by communicating Bluetooth devices to minimize the effects of signal interference in the ISM band. The Bluetooth technology is set forth in detail in Bluetooth SIG, *Specification of the Bluetooth System*, Version 1.2, Nov. 5, 2003, incorporated herein in its entirety by reference.

The Bluetooth Personal Area Networking Profile (hereinafter "the PAN Profile") provides a conceptual basis on which two or more Bluetooth-enabled devices can form and participate in personal area networks (PANs), allowing them to interoperate and exchange data. (See Bluetooth SIG, *Personal Area Networking Profile*, Version 1.0, Feb. 14, 2003, incorporated herein in its entirety by reference.) The PAN Profile describes three roles that a Bluetooth device may assume: Network Access Point (NAP), Group Ad-hoc Network (GN), and Personal Area Network User (PANU). NAP and GN correspond to services that may be used by a Bluetooth device operating as a client PANU. "NAP", "GN," and "PANU" will be used hereinafter to refer generally to the Bluetooth-equipped node providing the respective NAP, GN or PANU service.

In the Bluetooth context, a NAP is a device that contains one or more Bluetooth radio devices within a "piconet," and acts as a bridge, proxy or router to a second network (such as a 10BaseT Ethernet LAN) with respect to one or more PANUs with a Bluetooth wireless connection to the NAP, in addition to enabling the NAP and PANU devices within the piconet to communicate with each other. Each such PANU thereby may gain access to the second network's shared resources. A GN is a collection of Bluetooth devices that interact with one another to form a self-contained temporary wireless network within a piconet, and does not interconnect with a second network infrastructure. In both the NAP and the GN scenarios, data exchange is by way of the Bluetooth Network Encapsulation Protocol (BNEP), which provides for encapsulation of Ethernet packets. (See Bluetooth SIG, *Bluetooth Network Encapsulation Protocol (BNEP) Specification* [hereinafter "the BNEP Specification"], Version 1.0, Feb. 14, 2003, incorporated herein in its entirety by reference.)

While the BNEP Specification and the PAN Profile contain conceptual definitions and general constraints on features of conformant PAN role-providing implementations, these documents leave open the architectural and algorithmic makeup of such implementations. This creates an opportunity to develop the new and useful approach to implementing aspects of a Bluetooth PAN driver module that is disclosed herein.

SUMMARY OF THE INVENTION

The following provides a simplified summary of certain embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is provided below.

In accordance with certain embodiments of the invention, a system is provided for implementing personal area networking on a local machine having one or more local Bluetooth devices. A set of interoperating data structures are employed in an implementation of a PAN driver. A list of device control blocks (DCBs) is maintained, each DCB being associated with a local Bluetooth device. A list of connection control blocks (CCBs) is associated with each DCB. A CCB is associated with a remote Bluetooth device having a connection to a local Bluetooth device. Each CCB has a transmit packet queue and a receive packet queue.

In accordance with other aspects of the invention, a system and method are provided for enabling personal area networking on a Bluetooth device by way of a device control block (DCB) data structure operating as a finite state machine. In addition, a system and method are provided for controlling a connection on a Bluetooth PAN device by way of a connection control block (CCB) data structure, which includes an L2CAP CCB and a BNEP CCB, both operating as finite state machines.

In accordance with another aspect of the invention, a method is provided for setting and advertising multiple PAN profile roles in a Bluetooth device. Initially the local device performs the PANU role, while advertising both a PANU role and a GN service. If a remote device attempts to connect to the GN service, the local device switches to providing the GN service and removes a PANU SDP service record. If no remote user of the GN service remains connected, the local device switches back to providing the PANU role, readvertises the PANU role, and retains the GN SDP service record. If a local user manually creates a bridge between the local device and another network connection, the local device switches to providing a NAP service and removes the PANU and GN SDP records. If a local user manually deletes the bridge, the device removes the NAP SDP record, switches back to and readvertises the PANU role, and reinstates the PANU and GN SDP records.

Other features of the invention will become apparent from the following detailed description when taken in conjunction with the accompanying drawings, of which:

DETAILED DESCRIPTION

In the following description, embodiments of the present invention will be described. For purposes of explanation, certain specific configurations and details are set forth in order to provide an adequate understanding of the presented embodiments. However, it will also be apparent to those having skill in the art that the present invention may be practiced without inclusion of those configurations and details. Furthermore, well-known features, and particularly features well-known to practitioners of ordinary skill in the computing and computer networking arts, may be omitted or simplified in order not to obscure the embodiment being described.

Figure 1:
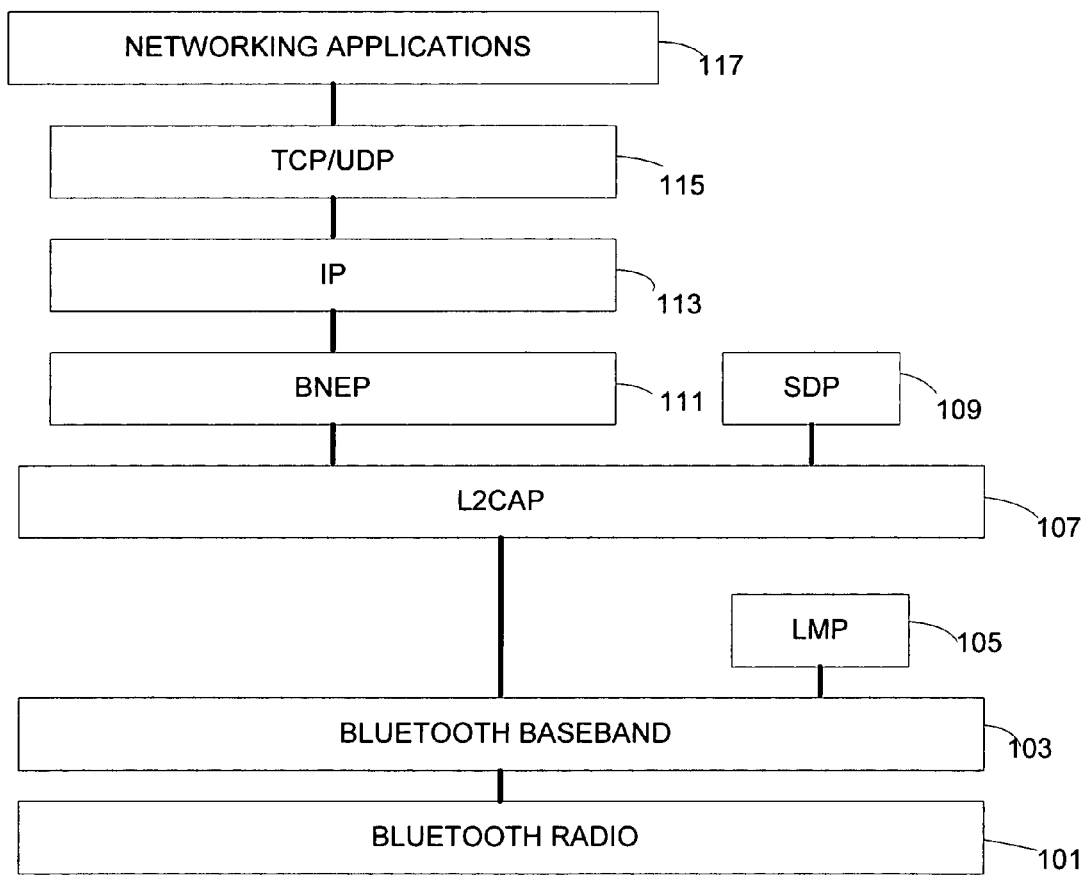
FIG. 1 is a block diagram providing an illustration of components of the Bluetooth network protocol stack in a PAN setting.

FIG. 1 provides an illustration of components of the multi-layered Bluetooth network protocol stack in a PAN setting involving IP traffic over Bluetooth. Embodiments of the present invention are situated within Bluetooth radio-equipped computing devices that implement this protocol stack. The components of the Bluetooth protocol stack are described in detail in the Bluetooth Specification and associated documents of the Bluetooth SIG or else are well-known, and will only be described in brief here. At the lowest level is the Bluetooth radio frequency layer 101. The Baseband protocol 103 enables the physical link to form a piconet with one or more other Bluetooth devices.

The Link Manager Protocol (LMP) 105 is responsible for link setup between Bluetooth nodes. LMP 105 handles the control and negotiation of packet sizes used when transmitting data. It also manages power modes and power consumption, as well as security features such as authentication and encryption. The LMP 105, Baseband 103 and Bluetooth radio 101 are typically implemented in Bluetooth hardware modules.

When a connection is established, the Logical Link Control and Adaptation Protocol (L2CAP) 107 provides connection-oriented and connectionless data services to upper layer protocols. L2CAP 107 implements a second link-layer protocol to address protocol multiplexing, segmentation, and reassembly. L2CAP serves as the Bluetooth data medium access control (MAC) layer. The Service Discovery Protocol 109 defines methods for discovering services available from or through Bluetooth devices. BNEP 111 encapsulates packets from various upper-layer network protocols, such as IPv4 and IPv6 113, so that they may be transported directly over the L2CAP 107. As illustrated in FIG. 1, networking applications 117 are transported over TCP/UDP 115 and IP 113. BNEP 111 provides an Ethernet-like interface to the IP layer 113.

Figure 2A:
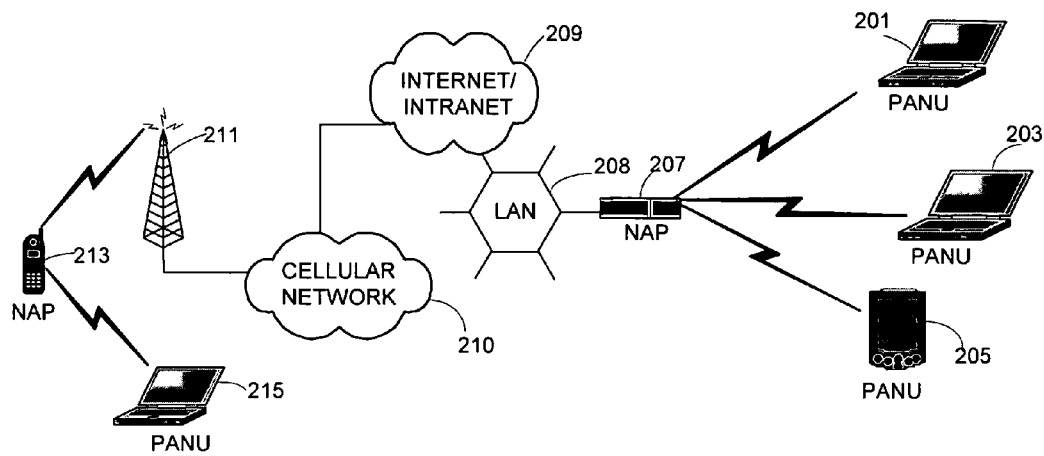
FIG. 2A is a diagram representing exemplary NAP PAN scenarios.
Figure 2B:
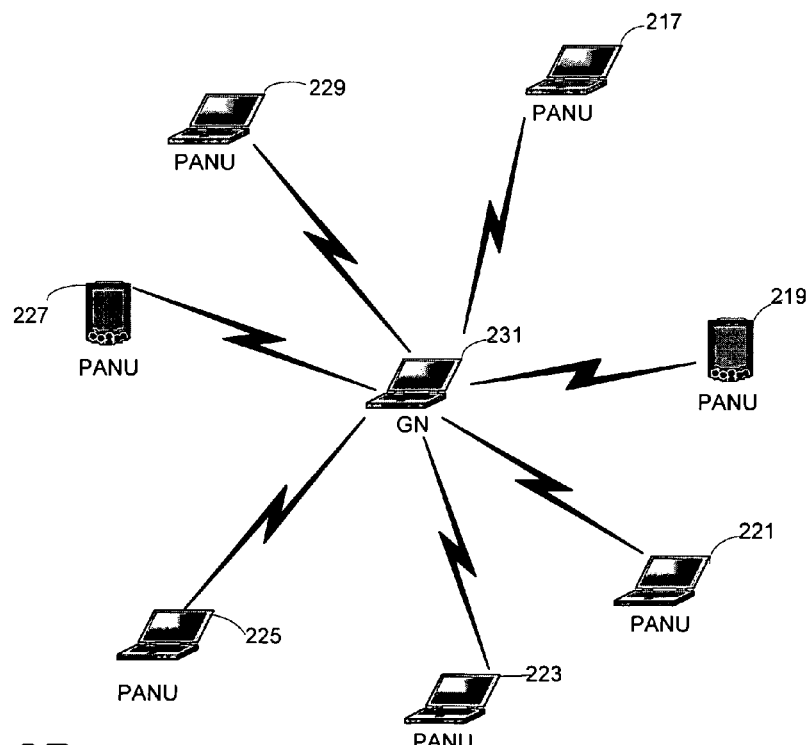
FIG. 2B is a diagram representing an exemplary GN PAN scenario.

FIGS. 2A and 2B illustrate exemplary topologies for the NAP PAN scenario and GN PAN scenario, respectively, as discussed above in the background section. Embodiments of the present invention may be practiced in either a NAP or a GN setting. In FIG. 2A two NAP-based Bluetooth networks are depicted. A Bluetooth access point 207 has a wired connection to a LAN 208 which is in turn linked to an IP-based network 209, which may be, for example, a corporate intranet or the larger Internet. Access to these other networks 208, 209 through the NAP device 207 is provided to the notebook PANU devices 201, 203 and the PDA PANU device 205. The other Bluetooth network depicted in FIG. 2A comprises the notebook PANU device 215 and the cellular phone 213, functioning as a NAP. The cellular phone 213 has a wireless link by way of the cell tower 211 to a cellular WAN 210, such as the IP-based General Packet Radio Service (GPRS), which is linked to the IP network 209.

FIG. 2B depicts a GN-based piconet comprising eight Bluetooth-equipped devices: notebooks 217, 221, 223, 225, 229, 231, and PDAs 219, 227. The notebook 231 provides the GN service, here operating as the piconet master with respect to slave PANU devices 217, 219, 221, 223, 225, 227, 229. The seven slave devices represent the maximum number of active slaves in a piconet.

Miniport Driver

Figure 3:
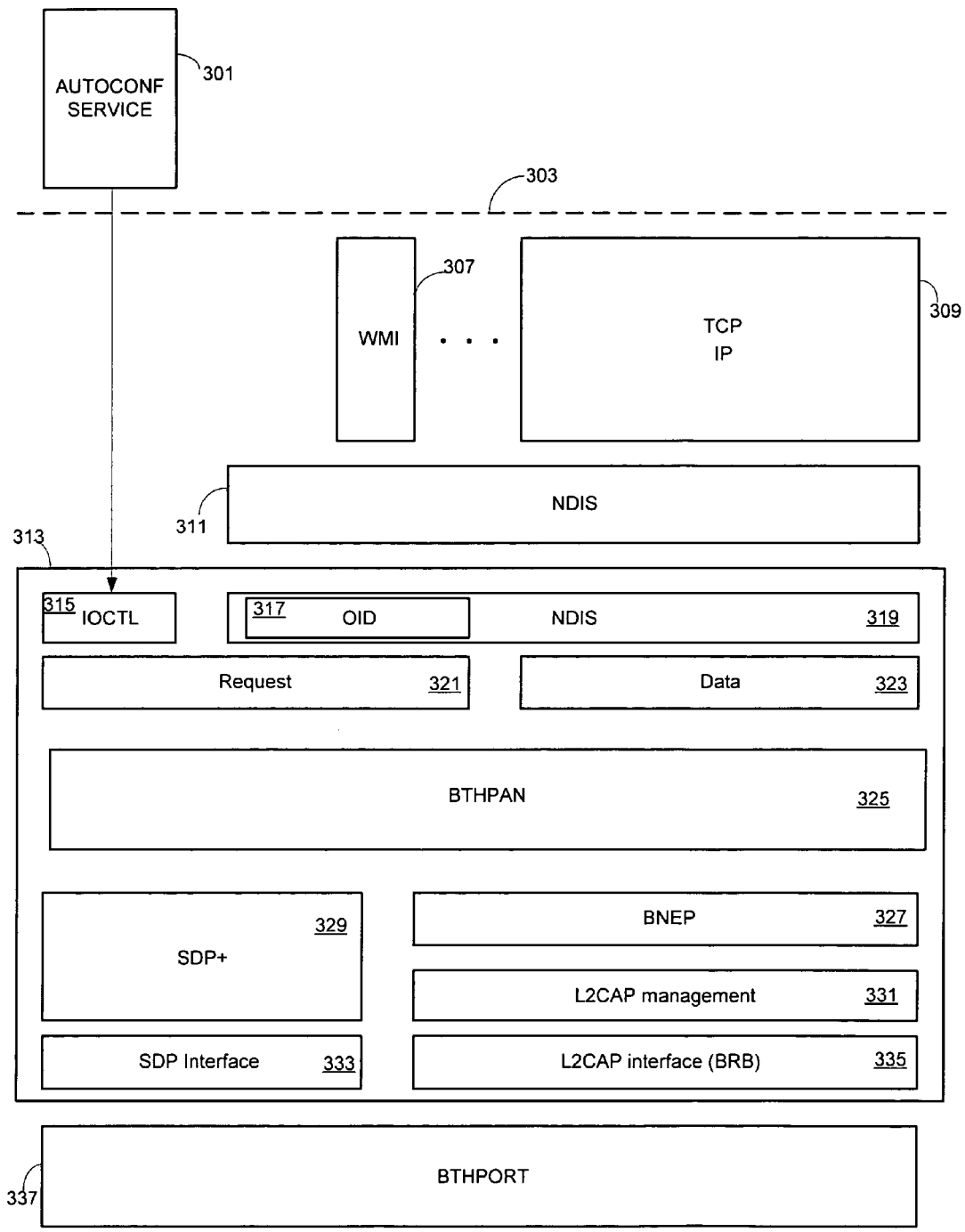
FIG. 3 is a block diagram illustrating generally the architecture of a PAN driver in accordance with an embodiment of the invention.

FIG. 3 illustrates generally the architecture of an embodiment of the invention. The depicted embodiment comprises a kernel-mode Microsoft® Windows deserialized connectionless NDIS miniport driver 313 (labeled "BTHPAN" in the diagram) situated between the lower levels of the Bluetooth stack and TCP/IP and accordingly functioning to bind Internet protocols with Bluetooth interfaces. Additionally, the driver serves to set the operative PAN role of the associated Bluetooth device.

The driver 313 comprises three basic layers. The middle layer is the main part, providing the services of the driver 313. The upper layer provides different interfaces that clients of the driver 313 use to access these services. The lower layer creates an abstract interface to the lower-level Bluetooth driver 337.

The lower layer provides a lower layer interface part 333, 335 and above it a lower layer abstraction part 329, 331. The lower layer interface comprises an SDP interface 333 and L2CAP interface 335 to the SDP and L2CAP services that are used by the driver 313 and are implemented in the lower-level BTHPORT driver 337. It hides IOCTL and WMI IRP details while providing an API that can be mapped to different drivers in the future. The SDP services are provided through a set of device I/O controls supported by BTHPORT 337. The L2CAP interface 335 abstracts away the mechanism for setting up and tearing down connections, as well as providing an abstraction of data transfer. Other functions handled at the L2CAP interface 335 include querying the Bluetooth radio for its MAC address. The SDP interface 333 provides an abstract interface to add and remove services. Interface routines are also provided to search an SDP record for a specific service or attribute or both. The SDP interface 333 also enables performing an inquiry for peer devices. While this is functionally a Baseband feature, it is included as part of the SDP interface 333 given its similarity in implementation to other SDP interface routines.

The lower layer abstraction includes a component 331 that manages the L2CAP connection state. The lower layer abstraction part also provides notifications to upper layers for data and incoming connection requests. Some management is performed in this sublayer to ensure state synchronization with the lower driver 337. This sublayer is also responsible for publishing and revoking complete SDP records for the currently running profile service.

The middle layer 325 comprises the main part of the driver 313 and contains all the services provided by the driver. The middle layer 325 interfaces with lower layer modules 333, 335 for accessing the SDP and L2CAP services of the lower BTHPORT driver 337. The middle layer includes a protocol sublayer and a profile sublayer. The protocol sublayer implements the BNEP protocol. It performs BNEP connection setup and teardown and PAN role changes. Data arriving at the protocol sublayer is framed in accordance with the BNEP Specification and sent out, or converted to an Ethernet packet and passed on to the host. The protocol sublayer is also responsible for setting and removing filters (as for multicast addressing and Ethernet types), and for IEEE 802.1D packet handling. The profile sublayer interfaces with both the SDP+ 329 and the BNEP 327 modules and handles the overall management of the PAN profile in accordance with Bluetooth specifications. The profile sublayer exports interfaces to allow configuration, connection setup and teardown, and data transfer. Additional interfaces are supplied that provide local radio information as well as information regarding currently established connections.

The upper layer comprises different modules that provide different interfaces to the BTHPAN services. The upper layer modules do not implement new services; this ensures consistent functionality across the different interfaces. The upper layer is divided into a data sublayer 323 and a request or control sublayer 321. In the illustrated embodiment the data sublayer 323 is essentially a null layer because the data interface is a simple and direct interface into BTHPAN services and therefore does not require any processing. The request sublayer 321 provides an interface to control the driver 313. This sublayer serves as an abstract interface to the driver 313. This permits multiple system interfaces such as IOCTLs 315 to be added in conjunction with the standard OID interface 317 provided by NDIS 319.

The request sublayer 321 provides interface routines to connect, disconnect, and configure the local device. Since a single driver is loaded for all Bluetooth network interfaces on the local machine, additional functionality is provided to enumerate all local devices. Each device may have multiple connections. The connections currently established can be queried by way of the request sublayer 321. The request sublayer 321 also provides notifications to upper layers.

Upper-layer interface modules interact with the request sublayer 321 to access driver services. In the illustrated embodiment, the interface modules include the OID interface 317 by way of NDIS 319, which permits kernel mode access as well as WMI calls from user space, and an IOCTL interface 315.

In the illustrated embodiment, the kernel-mode driver 313 operates in association with a user-mode PAN service component 301. The PAN Service 303 provides for automatic connectivity to a remote Bluetooth device having an appropriate profile role and automates the task of configuring a network interface card in accordance with a set of rules saved by the user. Aspect of such a service are disclosed in U.S. application Ser. No. 10/724,843, "Smart Scan For Bluetooth PAN Devices," filed on the same day as the present application and having certain inventors in common and sharing a common assignee with the present application, which is incorporated herein by reference, and in U.S. application Ser. No. 10/693,655, "Network and Interface Selection on a Computing Device Capable of Establishing Connections Via Multiple Network Communications Media," filed Oct. 24, 2003, having certain inventors and an assignee in common with the present invention, and also incorporated herein by reference.

Data Structures and State Machines

In accordance with the present invention, a novel set of data structures and associated state machines provide the foundation for the implementation of the PAN driver. Notably, the implementation includes a representation of a Bluetooth device on a local machine as a container for multiple connections, which makes possible a sophisticated approach to bridging and transferring.

Figure 4:
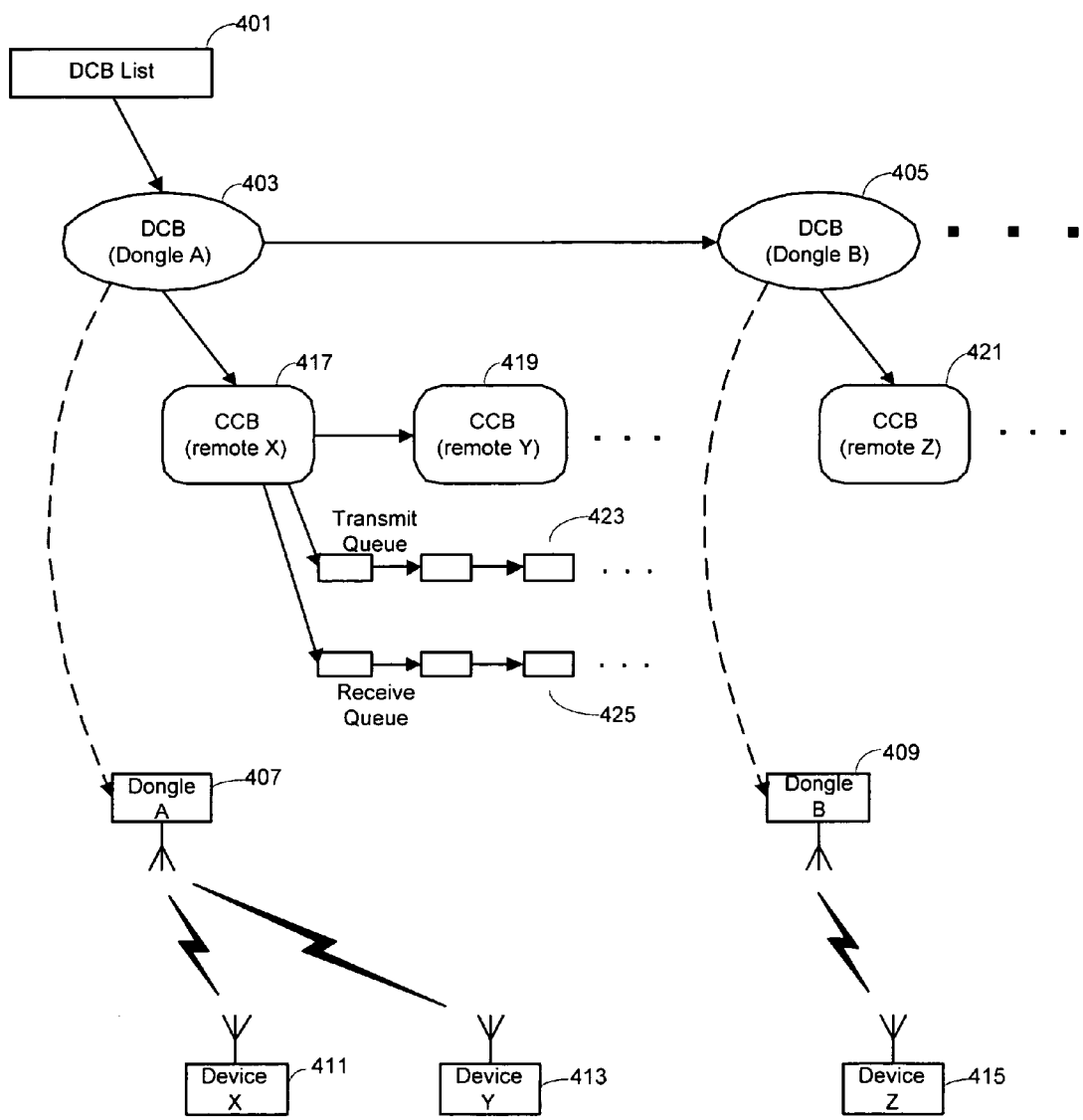
FIG. 4 is a diagram illustrating the relationships among certain data structures used in the implementation of a PAN driver in accordance with an embodiment of the invention.

FIG. 4 illustrates the data structures that are used in association with the driver. The driver maintains a list of device control blocks (DCBs) 401. Each DCB corresponds to a Bluetooth device on the local machine. In FIG. 4, the first two links 403, 405 in the DCB list are shown. As indicated by the broken curved arrow, the first DCB 403 represents physical Bluetooth dongle A 407, and the second DCB 405 represents dongle B 409. With the use of multiple devices on a local machine, some means of deciding on which device a requested connection is established; two possibilities are a random decision and a balancing scheme.

Associated with each DCB is a list of connection control blocks (CCBs), one CCB for each active connection between the local DCB device and a particular remote Bluetooth device. The DCB/CCB relationship thus treats a local device as a container for multiple connections. Each connection corresponds to a port. These ports may be used to allow port-specific functions, such as 802.1X security or 802.1D bridging, across multiple ports. The number of CCBs (and hence ports) that may be established on a CCB depends on the profile role of the DCB. A server profile role such as GN supports multiple CCBs and automatically enables 802.1D bridging across all CCBs created in the DCB. This DCB then acts as a bridge group that can be bridged with another network such as an Ethernet based LAN. In FIG. 4, on the physical level, peer device X 411 and peer device Y 413 have connections to dongle A 407. This is modeled by the data structures on the local driver: the DCB 403 for dongle A has a reference to a CCB list that includes a CCB 417 for remote device X and a CCB 419 for remote device Y. Similarly, remote device Z 415 is depicted as having a connection to dongle B 409, and the DCB 405 for dongle B has an associated CCB 421 corresponding to device Z 415. Each CCB in turn has at least one transmit queue 423 and one receive queue 425. These queues are used to track outgoing and incoming packets, respectively.

Figure 5:
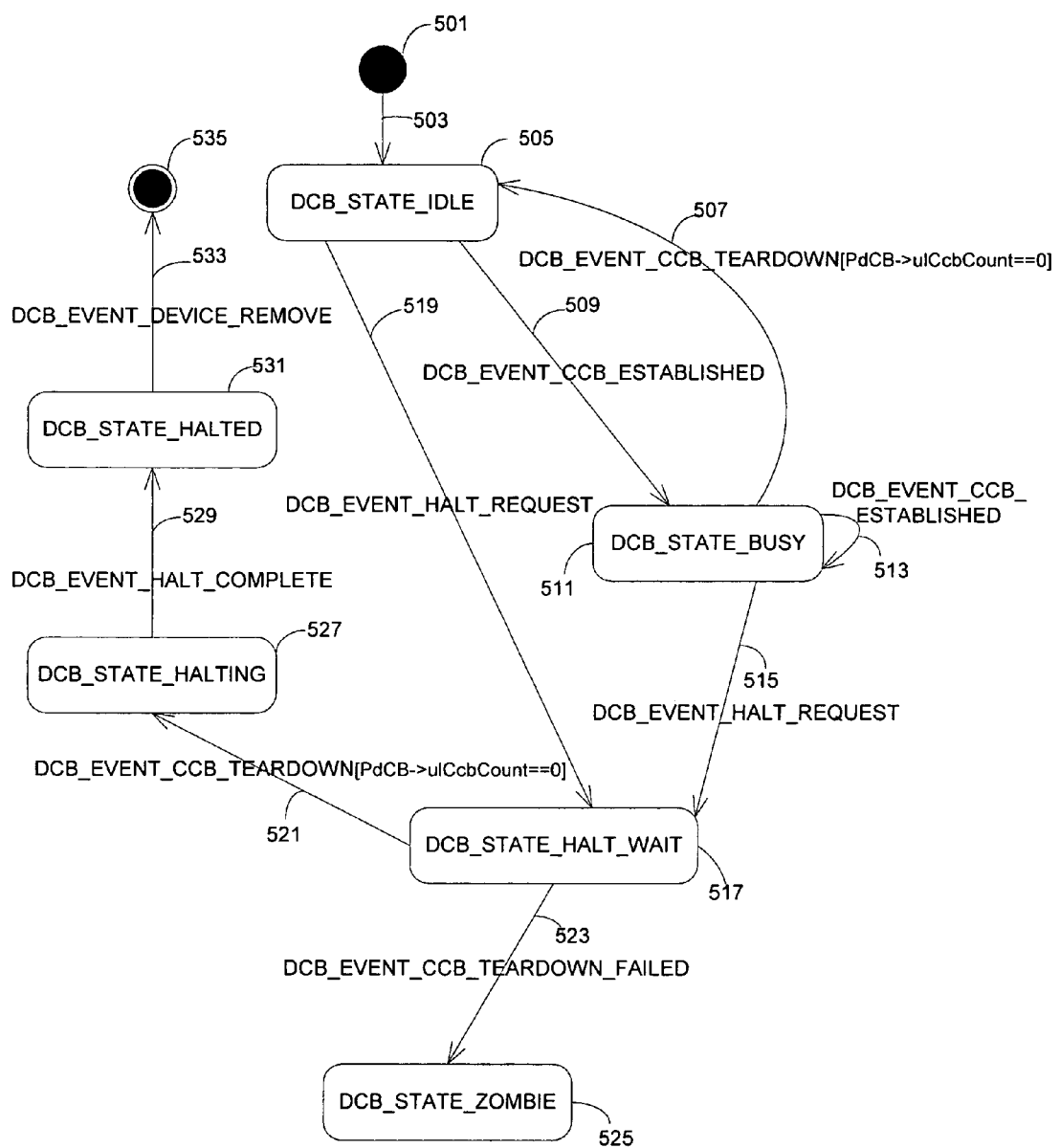
FIG. 5 is a UML state chart generally illustrating the device control block finite state machine.

The DCB operates as a finite state machine, as illustrated in the UML state chart in FIG. 5. From the initial state 501, when a Bluetooth device is added (as, for example, by inserting a Bluetooth-capable card into a laptop), a transition 503 to an idle state 505 occurs. The user can now choose to make a connection to another device, and a peer can make a connection to the local device (a "CCB established" event). Such an event causes a transition 509 to a busy state 511. A number of transitions are possible from the busy state 511. The DCB remains in the busy state 511 if further CCB established events occur, as indicated in transition 513. If there is one remaining CCB that is torn down, a transition 507 back to the idle state 505 occurs. A halt request event causes transitions 515, 519 from the busy state 511 and the idle state 505, respectively, to a halt wait state 517. From the halt wait state, a CCB teardown failed event causes a transition 523 to a zombie state 525. A transition 521 from the halt wait state 517 to a halting state 527 occurs if the last active CCB is torn down. From the halting state 527, a transition 529 to a halted state 531 occurs following a halt complete event. Finally, a transition 533 from the halted state 531 to terminal state 535 occurs upon removal of the device corresponding to the DCB.

Figure 6:
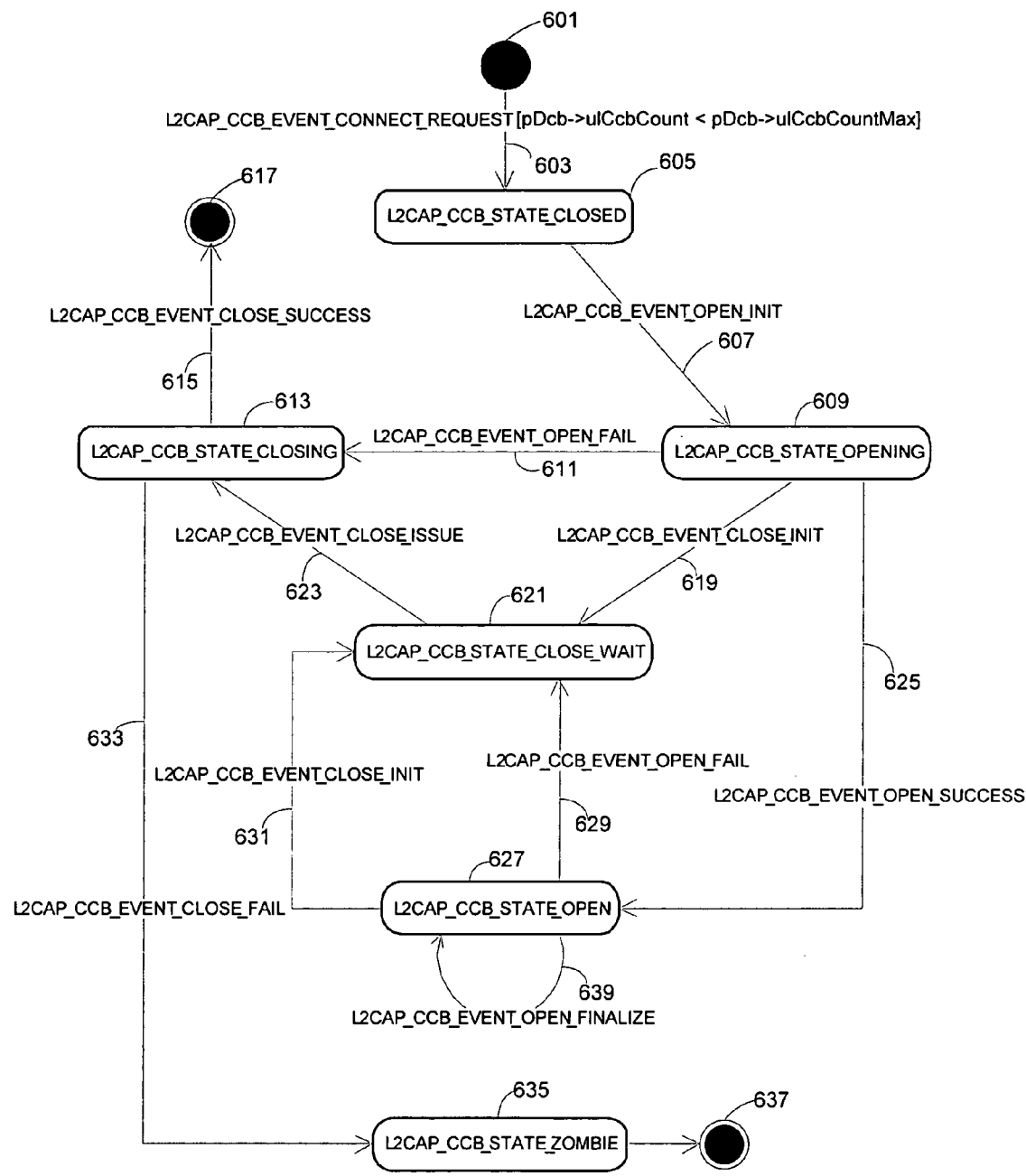
FIG. 6 is a UML state chart generally illustrating the L2CAP connection control block finite state machine.

The CCB structure exists at three different levels: L2CAP, BNEP and PAN, so that connection state can be tracked separately at each level. The L2CAP CCB and the BNEP CCB operate as finite state machines. FIG. 6 is a UML state chart illustrating the L2CAP CCB. From an initial state 601, a connect request causes a transition 603 to a closed state 605, if the number of active connections has not exceeded a maximum. From the closed state 605, an open initialize event causes a transition 607 to an opening state 609. From the opening state 609, three transitions are possible. An open fail event causes a transition 611 to a closing state 613. A close initialize event causes a transition 619 to a close wait state 621. An open success event causes a transition 625 to an open state 627.

Three transitions are possible from the open state 627. An open finalize event causes a transition 639 to the open state 627. An open fail event causes a transition 629 to the close wait state 621. A close initialize event also causes a transition 631 to the close wait state 621. From the close wait state 621, a close issue event causes a transition 623 to the closing state 613. From the closing state 613, a close success event causes a transition 615 to terminal state 617, while a close fail event causes a transition 633 to a zombie state 635, and then to terminal state 637.

Figure 7:
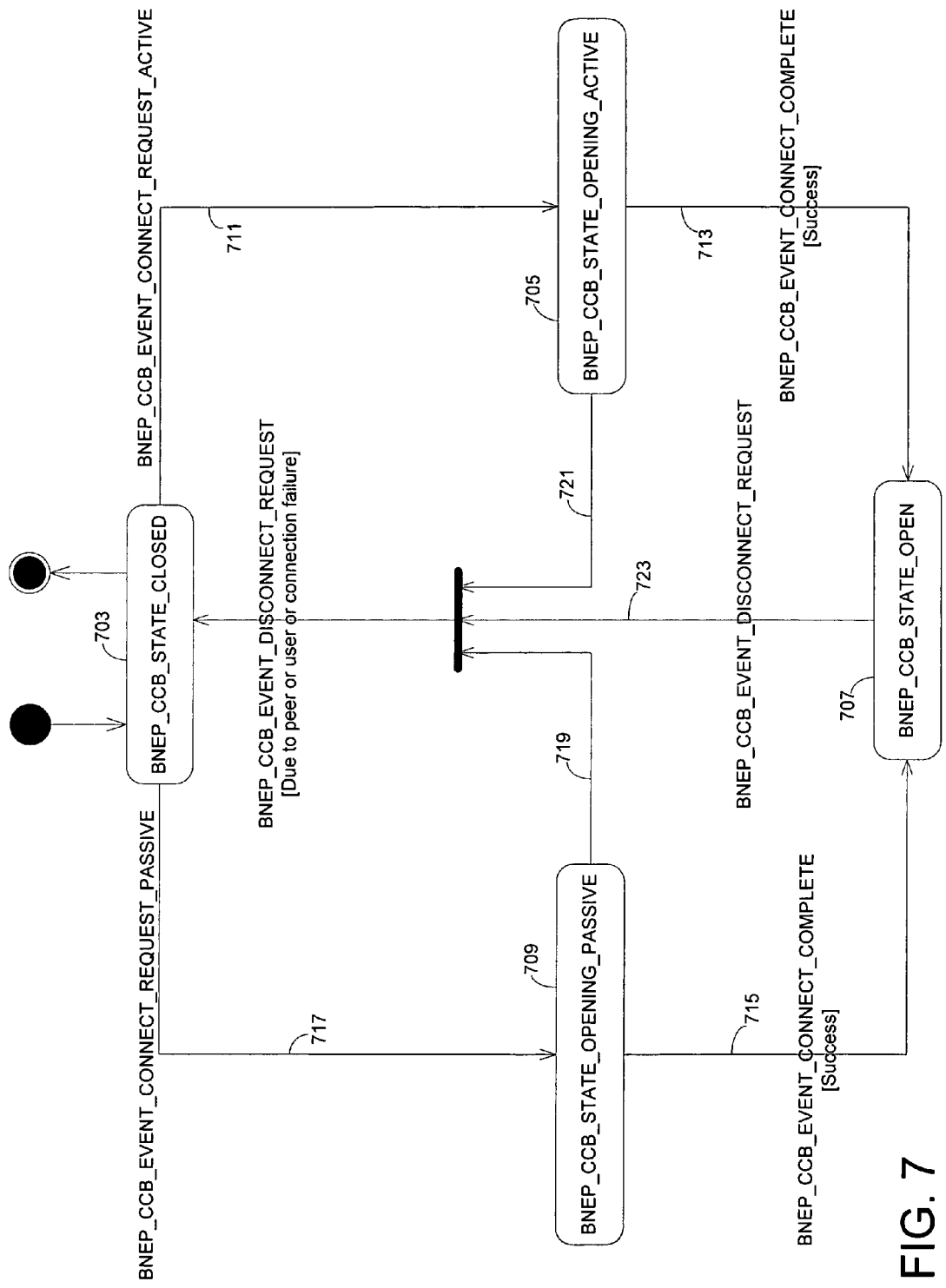
FIG. 7 is a UML state chart generally illustrating the BNEP connection control block finite state machine.

FIG. 7 is a UML state chart illustrating the simpler BNEP CCB finite state machine. Initially a closed state 703 is entered. An active connect request event causes a transition 711 to an opening active state 705, while a passive connect request event causes a transition 717 to an opening passive state 709. From the opening active state 705, a successful connect complete event causes a transition 713 to an open state 707. Similarly, from the opening passive state 709, the same event causes a transition 715 to the open state 707. From the open state 707, the opening passive state 709, and the opening active state 705, transitions 723, 719, 721 respectively back to the closed state 703 occur on a disconnect request event, which may be due to the peer or the user, or to connection failure.

Selecting Multiple Profile Roles

In an embodiment of the invention, the PAN driver selects and advertises a single PAN role. A different embodiment of the invention includes an alternative approach to setting and advertising PAN roles, in which all the PAN roles are advertised. The first BNEP connection determines the PAN role of the driver.

In this alternative embodiment, upon initialization the driver begins in the PANU mode. However, in addition to its PANU profile, the driver also advertises its GN server profile. If a remote device attempts to connect to the GN service, the PAN driver switches to the GN mode. The driver then removes the PANU service record from SDP. If all users of the GN service disconnect from the driver, the driver switches back to the PANU mode, readvertising its PANU profile while keeping the GN service record in SDP.

If the user of the local Bluetooth device manually creates a bridge between the local device and another network connection, the PAN driver switches to the NAP mode and removes both PANU and GN service records in SDP. If the bridge is manually deleted by the user, the NAP service record will be removed from SDP, and the PANU and GN service records will be reinstated.

Figure 8:
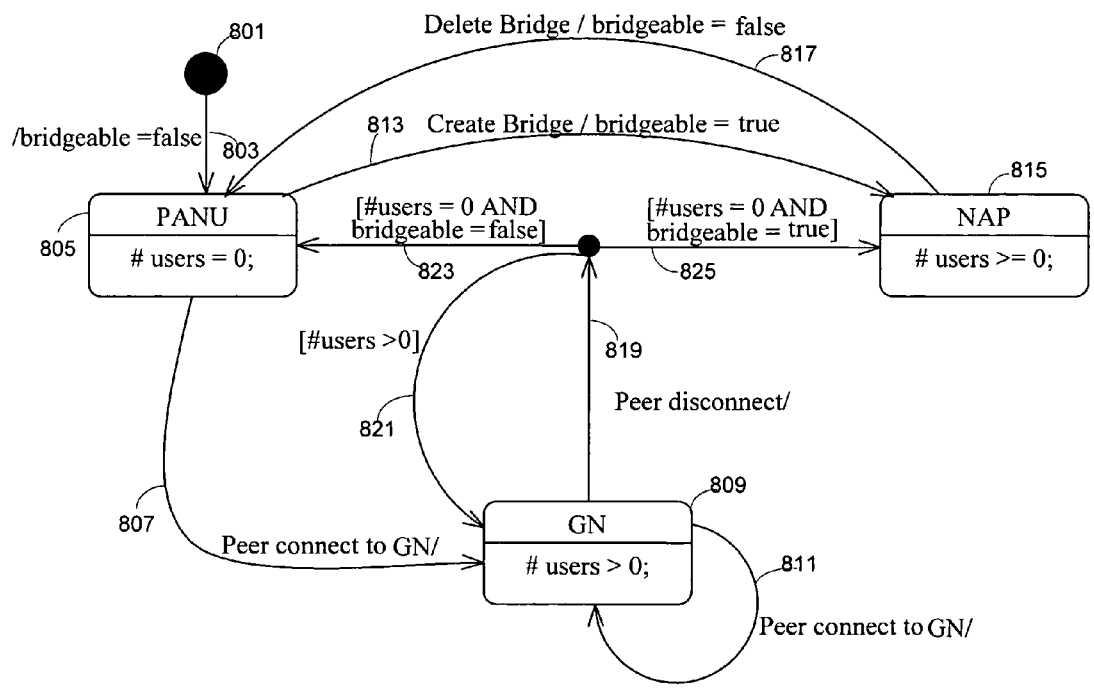
FIG. 8 is a UML state chart modeling a technique by which a PAN driver selects and advertises multiple PAN profile roles in accordance with an embodiment of the invention.

This alternative embodiment is illustrated in the UML state chart in FIG. 8. From an initial state 801, a transition 803 is made to the PANU state 805, with a "bridgeable" boolean value set to false. In the PANU state 805 the number of remote users of the PAN driver is zero. Upon a peer connect to the advertised GN service, a transition 807 is made to the GN state 809, in which the number of remote users is greater than zero. In the GN state 809, upon an additional peer connection to the GN service, a looping transition 811 to the GN service is made.

In the PANU state 805, the occurrence of a Create Bridge event causes a transition 813 to the NAP state 815, with bridgeable set to true. At the NAP state 815 there are zero or more remote users. From the NAP state 815, a Delete Bridge event causes a transition 817 back to the PANU state 805, with bridgeable set to false.

From the GN state 809, a Peer Disconnect event 819 causes one of three transitions 821, 823, 825. If there are remaining connected peers, the transition 821 is back to the GN state 809. If there are no longer any connected peers, a transition 823 is made to the PANU state 805 if bridgeable is false, and a transition 825 is made to the NAP state 815 if bridgeable is true.

Those having skill in the art will readily perceive that the UML state chart of FIG. 8 specifies a finite state machine as well as a method for selecting and advertising a PAN role.

In multiuser GN and NAP modes, the PAN Profile specifies that the device be the master of the piconet. Therefore, in a piconet there should be no more than one device having the NAP role. However, a platform having multiple local Bluetooth devices may choose to act as a NAP on one local device and a PANU on another local device, leading to hierarchical bridging.

The term "computer-readable medium," as used in this specification and its appended claims, includes any medium for temporary or persistent storage of data capable of being read by a suitable computing device, including a computing device functioning as a wireless Bluetooth radio-equipped host or network node. Examples of such computer-readable media include, without limitation, volatile and non-volatile primary memory, removable and non-removable magnetic disk storage, optical disk storage, and network interface media.

The use of the terms "a", "and," "the," and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate embodiments of the invention and is not a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those having ordinary skill in the art upon reading the foregoing description. The inventors expect skilled practitioners to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for enabling personal area networking on a Bluetooth device, the method comprising:
    controlling state of a device control block (DCB), wherein controlling the state of the DCB comprises:
    when the Bluetooth device is added, causing the DCB to enter an idle state;
    from the idle state, in response to a halt request event, entering a halt wait state;
    from the idle state, in response to a connection control block (CCB) established event, causing the DCB to enter a busy state;
    from the busy state, in response to a CCB teardown event reducing to zero a count of CCBs associated with the DCB, causing the DCB to return to the idle state;
    from the busy state, in response to a CCB established event, causing the DCB to remain in the busy state;
    from the busy state, in response to a halt request event, causing the DCB to enter the halt wait state;
    from the halt wait state, in response to a CCB teardown event reducing to zero a count of CCBs associated with the DCB, causing the DCB to enter a halting state;
    from the halt wait state, in response to a CCB teardown failed event, causing the DCB to enter a zombie state;
    from the halting state, in response to a halt complete event, causing the DCB to enter a halted state; and
    from the halted state, in response to a device remove event, causing the DCB to enter a terminal state.

2. A method for controlling a connection on a Bluetooth Personal Area Network (PAN) device, the method comprising:
    controlling state of a Logical Link Control Adaptation Protocol (L2CAP) connection control block (CCB), wherein controlling the state of the L2CAP CCB comprises:
    initially causing the L2CAP CCB to enter a closed state;
    from the closed state, in response to an open initialize event, causing the L2CAP CCB to enter an opening state;
    from the opening state, in response to an open fail event, causing the L2CAP CCB to enter a closing state;
    from the opening state, in response to a close initialize event, causing the L2CCB to enter a close wait state;
    from the opening state, in response to an open success state, causing the L2CAP CCB to enter an open state;
    from the closing state, in response to a close success event, having the L2CAP CCB enter a terminal state;
    from the closing state, in response to a close fail event, having the L2CAP CCB enter a zombie state;
    from the close wait state, in response to a close issue event, having the L2CAP CCB enter the closing state;
    from the open state, in response to the close initialize event, having the L2CAP CCB enter the close wait state;
    from the open state, in response to the open fail event, having the L2CCB enter the close wait state; and
    from the open state, in response to an open finalize event, having the L2CAP CCB remain in the open state; and
    controlling state of a Bluetooth Network Encapsulation Protocol (BNEP) CCB.

3. A method for controlling a connection on a Bluetooth Personal Area Network (PAN) device, the method comprising:
    controlling state of a Logical Link Control Adaptation Protocol (L2CAP) connection control block (CCB); and
    controlling state of a Bluetooth Network Encapsulation Protocol (BNEP) CCB, wherein controlling the state of the BNEP CCB comprises:
    initially causing the BNEP CCB to enter a closed state;
    from the closed state, in response to a connect request passive event, causing the BNEP CCB to enter an opening passive state;
    from the closed state, in response to a connect request active event, causing the BNEP CCB to enter an opening active state;
    from the opening passive state, in response to a successful connect complete event, causing the BNEP CCB to enter an open state;
    from the opening passive state, in response to a disconnect request event, causing the BNEP CCB to enter the closed state;
    from the opening active state, in response to a successful connect complete event, causing the BNEP CCB to enter an open state;
    from the opening active state, in response to a disconnect request event, causing the BNEP CCB to enter the closed state, and
    from the open state, in response to a disconnect request event, causing the BNEP CCB to enter the closed state.

4. A system for enabling personal area networking on a Bluetooth device, the system comprising:
    a finite state machine associated with a device control block (DCB), the finite state machine associated with the DCB comprising:
    a plurality of states, further comprising an idle state, a busy state, a halt wait state, a zombie state, a halting state, and a halted state;
    a plurality of transition events, further comprising a device add event, a connection control block (CCB) teardown event, a CCB established event, a halt request event, a CCB teardown failed event, a halt complete event, and a device remove event; and
    a plurality of transitions, further comprising:
    an initial transition to the idle state, associated with the device add event;

a transition from the idle state to the halt wait state, associated with the halt request event;

a transition from the idle state to the busy state, associated with the CCB established event;

a transition from the busy state to the idle state, associated with the CCB teardown event and a zero CCB count;

a transition from the busy state to the busy state, associated with the CCB established event;

a transition from the busy state to the halt wait state, associated with the halt request event;

a transition from the halt wait state to the zombie state, associated with the CCB teardown failed event;

a transition from the halt wait state to the halting state, associated with the CCB teardown event and a zero CCB count;

a transition from the halting state to the halted state, associated with the halt complete event; and a transition from the halted state to a terminal state, associated with the device remove event.

5. A system for controlling a connection on a Bluetooth Personal Area Network (PAN) device, the system comprising:

a finite state machine associated with a Logical Link Control Adaptation Protocol (L2CAP) connection control block (CCB), the finite state machine comprising:

a plurality of states, further comprising a closed state, an opening state, a closing state, a close wait state, an open state, and a zombie state;

a plurality of transition events, further comprising a connect request event, an open initialize event, a close success event, a close issue event, a close initialize event, an open fail event, an open success event, a close fail event, and an open finalize event; and a plurality of transitions, further comprising:

a transition from an initial state to the closed state, associated with the connect request event and a connection count not exceeding a maximum;

a transition from the closed state to the opening state, associated with the open initialize event;

a transition from the opening state to the closing state, associated with the open fail event;

a transition from the opening state to the close wait state, associated with the close initialize event;

a transition from the opening state to the open state, associated with the open success event;

a transition from the closing state to a terminal state, associated with the close success event;

a transition from the closing state to the zombie state, associated with the close fail event;

a transition from the close wait state to the closing state, associated with the close issue event;

a transition from the open state to the close wait state, associated with the close initialize event;

a transition from the open state to the close wait state, associated with the open fail event; and a transition from the open state to the open state, associated with the open finalize event and a finite state machine associated with a Bluetooth Network Encapsulation Protocol (BNEP) CCB.

6. The system of claim 5 wherein the finite state machine associated with the BNEP CCB comprises:

a plurality of states, further comprising a closed state, an opening passive state, an 10 opening active state, and an open state;

a plurality of transition events, further comprising a connect request passive event, a connect request active event, a disconnect request event, and a connect complete event; and a plurality of transitions, further comprising:

a transition from an initial state to the closed state;

a transition from the closed state to the opening passive state, associated with the connect request passive event;

a transition from the closed state to the opening active state, associated with the connect request active event;

a transition from the opening passive state to the open state, associated with the connect complete event;

a transition from the opening passive state to the closed state, associated with the disconnect request event;

a transition from the opening active state to the open state, associated with the connect complete event;

a transition from the opening active state to the closed state, associated with the disconnect request event; and a transition from the open state to the closed state, associated with the disconnect request event.

7. The system of claim 6 wherein the disconnect request event is due to one of (a) a peer, (b) a local user, and (c) a connection failure.

8. A method for setting and advertising multiple Personal Area Network (PAN) profile roles in a Bluetooth device, the method comprising:

operating as a Personal Area Network User (PANU) while advertising a PANU role and a Group Ad-hoc Network (GN) GN service;

if a remote device attempts to connect to the GN service, switching to providing the GN service, and removing a PANU Service Discovery Protocol (SDP) service record;

if no remote user of the GN service remains connected, switching back to providing the PANU role, readvertising the PANU role, and retaining a GN SDP service record;

if a local user manually creates a bridge between the Bluetooth device and another network connection, switching to providing a NAP service, and removing the PANU SDP record and the GN SDP record; and if the local user manually deletes the bridge, removing a NAP SDP record, switching back to and readvertising the PANU role, and reinstating the PANU SDP record and the GN SDP record.

9. A system having a finite state machine for setting and advertising multiple Bluetooth Personal Area Network (PAN) PAN profile roles, the system comprising:

a Personal Area Network User (PANU) role state, associated with advertising of both a PANU profile and a Group Ad-hoc Network (GN) service;

a GN role state;

a transition from the PANU role state to the GN role state, associated with a connection to the GN service by a remote Bluetooth device;

a transition from the GN role state to the PANU role state, associated with all users of the GN service disconnecting from the GN service;

a Network Access Point (NAP) role state;

a transition to the NAP role state associated with a creation of a bridge to another network connection; and a transition from the NAP role state to the PANU role state, associated with a deletion of the bridge.

10. A computer-readable medium having computer-executable instructions implementing a method for setting and advertising multiple PAN profile roles in a Bluetooth device, the method comprising:

operating as a Personal Area Network User (PANU) while advertising a PANU role and a Group Ad-hoc Network (GN) service;

if a remote device attempts to connect to the GN service, switching to providing the GN service, and removing a PANU Service Discovery Protocol (SDP) service record;

if no remote user of the GN service remains connected, switching back to providing the PANU role, readvertising the PANU role, and retaining a GN SDP service record;

if a local user manually creates a bridge between the Bluetooth device and another network connection, switching to providing a NAP service, and removing the PANU SDP record and the GN SDP record; and if the local user manually deletes the bridge, removing a NAP SDP record, switching back to and readvertising the PANU role, and reinstating the PANU SDP record and the GN SDP record.

* * * * *